United States Patent [19]

Garner

[11] 4,406,081
[45] Sep. 27, 1983

[54] FISHING BOBBER WITH LINE RELEASE

[76] Inventor: Donald R. Garner, 760 Carla St., Livermore, Calif. 94550

[21] Appl. No.: 285,294

[22] Filed: Jul. 21, 1981

[51] Int. Cl.³ .............................................. A01K 93/00
[52] U.S. Cl. ................................. 43/43.11; 43/44.95
[58] Field of Search .................. 43/43.11, 43.1, 44.92, 43/44.95

[56] References Cited

U.S. PATENT DOCUMENTS

| | | | |
|---|---|---|---|
| 2,720,720 | 10/1955 | Landrum | 43/43.11 |
| 2,904,923 | 9/1959 | Conyers | 43/43.11 |
| 2,909,865 | 10/1959 | Ehlert | 43/43.11 |
| 2,963,813 | 12/1960 | Graham | 43/43.11 |
| 3,144,729 | 8/1964 | Jonassen | 43/43.11 |
| 3,168,790 | 2/1965 | Creasey | 43/43.11 |
| 3,214,858 | 11/1965 | Louie | 43/41.2 |
| 3,255,549 | 6/1966 | Riley | 43/43.11 |
| 3,352,050 | 11/1967 | Mowrey | 43/41.2 |
| 3,375,603 | 4/1968 | Loghry | 43/43.11 |
| 3,400,482 | 9/1968 | Ekstrand | 43/43.11 |
| 3,425,151 | 2/1969 | Salfer | 43/43.11 |
| 3,557,486 | 1/1971 | Wright | 43/44.95 X |
| 3,577,669 | 5/1971 | Johnson | 43/43.11 |
| 3,613,289 | 10/1971 | Wehren | 43/43.11 |
| 3,694,951 | 10/1972 | Modeme | 43/41.2 |
| 3,714,731 | 2/1973 | Benson | 43/43.11 |
| 3,747,257 | 7/1973 | Olsen | 43/44.92 X |
| 3,753,309 | 8/1973 | Bryant | 43/17.5 |
| 3,755,953 | 9/1973 | Milner | 43/43.11 |
| 3,832,797 | 9/1974 | Smedley | 43/43.11 |
| 3,977,115 | 8/1976 | Check | 43/43.11 |

Primary Examiner—Nicholas P. Godici
Assistant Examiner—M. Jordan
Attorney, Agent, or Firm—Thomas Schneck

[57] ABSTRACT

A bobber having an automatic line release feature wherein line to be released is stored on a spool formed by an annular flange on one side and a bobber on the other side. A pin extends through the bobber with a hook-shaped end which retains the fishing line in place. An opposite end of the pin is terminated in a cylindrical stub which is free to move up and down within a well. Fishing line is connected to the stub so that upward tension occurs during casting, forcing the pin and in particular the hook-shaped portion retaining the line upwardly, closing the spool. When line tension is released, the cylindrical stub falls and so does the hook which retains the line. The line is now free to slide off of the spool.

1 Claim, 3 Drawing Figures

FISHING BOBBER WITH LINE RELEASE

DESCRIPTION

1. Technical Field

The invention relates to fishing bobbers and in particular, to a bobber capable of storing fishing line leader during casting and releasing the line leader upon loss of fishing line tension, i.e., when a cast is complete.

2. Background Art

The idea of a bobber with a line release feature is well known in the prior art. However, such devices are not widely used because in fishing, it is common to lose bobbers. Accordingly, bobbers must be simple in construction so that their cost can be modest. A unitary, molded construction would be preferred. An object of the invention is to provide a low-cost, simplified construction for a line release bobber.

DISCLOSURE OF INVENTION

The above object has been achieved in a line release bobber having a spool with one rim formed by an annular flange and the opposite rim formed by the base of a bobber. The bobber includes a well opposite the base with an internal passage through which a pin extends. At one end the pin has a cylindrical stub which fits loosely within the well and limits the motion of the pin. At the opposite end, the pin has an upturned hook capable of spanning the width of the spool for retaining line. The cylindrical stub has a fishing line attachment which, when connected to a fishing line can apply upward tension on the stub and the pin, such as during a cast. This upward tension causes the hook to retain line on the spool. At the end of the cast tension is lost, causing the cylindrical stub to move downwardly within the well by gravity, thereby allowing line release from the spool.

An advantage of the present invention is that the spool and bobber are integrally connected and may be molded.

BEST MODE FOR CARRYING OUT THE INVENTION

Figure 1:
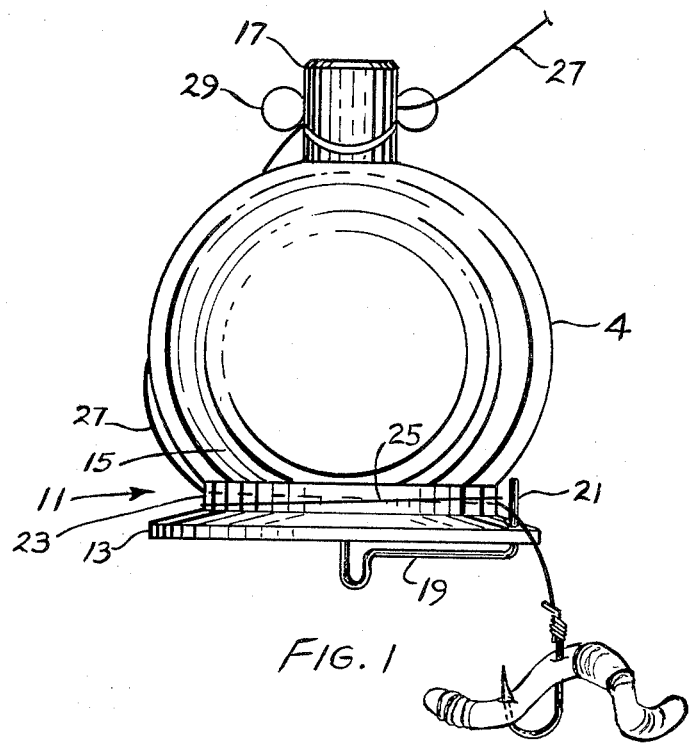
FIG. 1 is a side elevation of the line release bobber of the present invention.

With reference to FIG. 1, a spool 11 is illustrated which is formed on one side by an annular flange 13 and on the opposite side by the base of bobber 15. The bobber has a cylindrical stub 17 which is connected to one end of a pin, the other end of the pin terminating in a hook 19 having an upwardly turned pin section 21 capable of spanning the spool trough 23 so that fishing line leader 25 can be retained in the trough. This leader is connected to fishing line 27 in the usual way. A line attachment device 29 connects the fishing line to the cylindrical stub 17.

Figure 2:
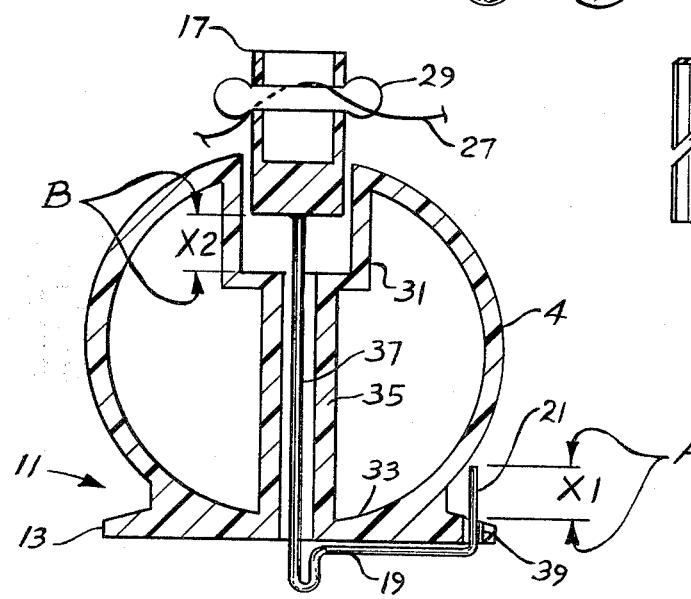
FIG. 2 is a side cutaway view of the apparatus illustrated in FIG. 1.

With reference to FIG. 2 a well 31 may be seen to be defined within the bobber at a region opposite base 33. A shaft 35 provides a passageway for pin 37. The pin, as previously mentioned, is connected to the cylindrical stub 17 at its upper end and at the opposite end terminates in hook 19. Flange 13 has a hole 39 defined therein allowing passage of the upwardly extending pin section 21 to pass therethrough. This section has a length equal to the dimension "X1" indicated between the arrows A in the Figure. This is the same dimension as the dimension "X2", indicated between arrows B. The dimension X2 is the amount of travel of the cylindrical stub 17 in the vertical direction within well 31.

Tension in fishing line 27 pulls the cylindrical stub 17 upwardly, e.g. during casting, thereby maintaining the upwardly extending pin region 21 in a position retaining fishing line. When this tension is relaxed, the cylindrical stub 17 will drop, reducing the dimension X2 to zero. Simultaneously, the dimension X1 will reduce to zero and the pin section 21 will drop. The fishing line will slide down the downwardly sloped wall of flange 13.

Figure 2A:
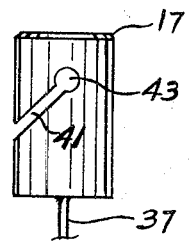
FIG. 2a is a side view of a cylindrical stub shown in FIG. 1.

FIG. 2a shows a side view of cylindrical stub 17. The stub has an angular slot 41 cut therein. This slot holds a fishing line in central region 43. Slot 41 is wide enough to accommodate a resilient bone-shaped attachment device 29 which may be seen in FIGS. 1 and 2.

An advantage of the line release bobber of the present invention is that the principal assembly, the line spool 11, is of unitary construction and may be molded out of a single piece of plastic. Into this piece of plastic the hook 37 is guided, with the cylindrical stub 17 placed in the well in the upper portion of the spool body. The hook itself may be of metal connected to the plastic stub member, with a resilient line attachment device 29. This minimal number of parts provides a low-cost construction for a spool with an automatic line release feature.

I claim:

1. A line release bobber comprising,
a fishing line spool having a trough between opposed rims, one rim formed by an annular flange and an opposite rim formed by a base region of a buoyant bobber having a well at a line connection region opposite the base region, the well having a central passage through which a pin extends, the pin having a stub connected at one end with a stub dimension loosely fitting in the well and having an upturned hook at the opposite end, the upturned hook capable of spanning the spool trough, said stub having an angular slot for a fishing line, a bone shaped resilient retainer for closing the slot to connect the fishing line, thereby applying upward tension on the pin to retain line in the trough in the presence of upward tension and to release line from the trough in the absence of upward tension.

* * * * *